(12) United States Patent
Yin et al.

(10) Patent No.: US 11,443,115 B2
(45) Date of Patent: *Sep. 13, 2022

(54) MACHINE LEARNING FROM TONE ANALYSIS IN ONLINE CUSTOMER SERVICE

(71) Applicant: International Business Machines Corporation, Armonk, NY (US)

(72) Inventors: Peifeng Yin, San Jose, CA (US); Zhe Liu, San Jose, CA (US); Anbang Xu, San Jose, CA (US); Taiga Nakamura, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 287 days.

This patent is subject to a terminal disclaimer.

(21) Appl. No.: 16/795,401

(22) Filed: Feb. 19, 2020

(65) Prior Publication Data
US 2020/0184150 A1 Jun. 11, 2020

Related U.S. Application Data

(63) Continuation of application No. 16/144,969, filed on Sep. 27, 2018, now Pat. No. 10,650,097.

(51) Int. Cl.
*G06F 40/289* (2020.01)
*G06N 20/00* (2019.01)
*G06F 16/951* (2019.01)
*G06F 40/205* (2020.01)

(52) U.S. Cl.
CPC ......... *G06F 40/289* (2020.01); *G06F 16/951* (2019.01); *G06F 40/205* (2020.01); *G06N 20/00* (2019.01)

(58) Field of Classification Search
None
See application file for complete search history.

(56) References Cited

U.S. PATENT DOCUMENTS

| 8,396,741 | B2 | 3/2013 | Kannan | |
| 9,883,358 | B2* | 1/2018 | Kalkounis | H04W 76/10 |
| 10,387,894 | B2* | 8/2019 | Akkiraju | G06Q 30/0269 |

(Continued)

OTHER PUBLICATIONS

Yin p. Liu Z, Xu A, Nakamura T. Tone analyzer for online customer service: An unsupervised model with interfered training. InProceedings of the 2017 ACM on Conference on Information and Knowledge Management Nov. 6, 2017 (pp. 1887-1895). (Year: 2017).*

(Continued)

*Primary Examiner* — Jonathan C Kim
(74) *Attorney, Agent, or Firm* — Sherman IP LLP; Kenneth L. Sherman; Steven Laut

(57) ABSTRACT

One embodiment provides a method that includes receiving adjusted labeled data based on emotional tone factors. Words are analyzed using a tone latent Dirichlet allocation (T-LDA) model that models tone intensity using the emotional tone factors and integrating the adjusted labeled data. Representative words are provided for each emotional tone factor based on using the T-LDA model. The representative words are obtained using the T-LDA model based on determining posterior probabilities and adjusting the posterior probabilities based on an auxiliary topic.

20 Claims, 8 Drawing Sheets

(56) References Cited

U.S. PATENT DOCUMENTS

| | | | | |
|---|---|---|---|---|
| 2011/0208753 | A1* | 8/2011 | Sivadas | G06F 3/015 |
| | | | | 715/764 |
| 2016/0042359 | A1* | 2/2016 | Singh | G06F 40/30 |
| | | | | 704/2 |
| 2016/0110343 | A1* | 4/2016 | Kumar Rangarajan Sridhar | |
| | | | | G06F 40/216 |
| | | | | 704/9 |
| 2016/0277577 | A1 | 9/2016 | Yentis | |
| 2017/0053558 | A1 | 2/2017 | Zhou | |
| 2017/0060982 | A1* | 3/2017 | Akkiraju | G06Q 30/02 |
| 2017/0061448 | A1* | 3/2017 | Akkiraju | G06Q 30/02 |
| 2017/0061497 | A1* | 3/2017 | Akkiraju | G06Q 30/0269 |
| 2018/0165696 | A1* | 6/2018 | Bessen | G06F 40/279 |
| 2018/0357286 | A1* | 12/2018 | Wang | G06F 16/243 |
| 2019/0311035 | A1* | 10/2019 | Chhaya | G06F 40/216 |
| 2019/0325897 | A1* | 10/2019 | Liu | H04M 3/5175 |
| 2020/0104364 | A1* | 4/2020 | Yin | G06N 7/005 |

OTHER PUBLICATIONS

Cambria E, Fu J, Bisio F, Poria S. AffectiveSpace 2: Enabling affective intuition for concept-level sentiment analysis. InProceedings of the AAAI Conference on Artificial Intelligence Feb. 10, 2015 (vol. 29, No. 1). (Year: 2015).*

Ramage D, Hall D, Nallapati R, Manning CD. Labeled LDA: A supervised topic model for credit attribution in multi-labeled corpora. InProceedings of the 2009 conference on empirical methods in natural language processing Aug. 2009 (pp. 248-256). (Year: 2009).*

Yang S, Zhang H. Text mining of Twitter data using a latent Dirichlet allocation topic model and sentiment analysis. International Journal of Computer and Information Engineering. Jun. 1, 2018;12(7):525-9. (Year: 2018).*

Aaker, J. "Dimensions of brand personality," Journal of marketing research, Aug. 1997, pp. 347-356, vol. 34, No. 3, ABI/INFORM Global, United States.

Agarwal, A. et al., "Sentiment analysis of twitter data," In Proceedings of the workshop on languages in social media, Jun. 2011, 30-38, Association for Computational Linguistics, United States.

Anonymously; "Method and apparatus for dynamic Big Data enabled insights based personalized IVR"; http://iip.com/IPCOM/000243546D. Sep. 30, 2015, pp. 1-12, IP.COM, United States.

Bollen, J. et al., "Twitter mood predicts the stock market," Journal of computational science, Mar. 2011, pp. 1-8, vol. 2., No. 1, arXiv.org, United States.

Byrd, G.; "ItEE/IBM Watson Student Showcase"; IEEE Computer Society; Jan. 2016, pp. 102-104, United States.

Devillers, L. et ai., "Emotion detection in task-oriented spoken dialogs," In Multimedia and Expo, Jul. 2003. pp. III-549, vol. 3, IEEE, United States.

Eysenck, H.J. "The structure of human personality," Psychology Revivals, 1953, 500 pages, Routledge, New York, New York {Abstract Only}.

Mell, P., et al., "The NIST Definition of Cloud Computing", National Institute of Standards and Technology Special Publication 800-145, Sep. 2011, pp. 1-7, U.S. Department of Commerce, United States.

Pennebaker, J.W et al., "Linguistic inquiry and word count," LIWC2001 Manual, 2001, pp. 1-24, Lawrence Erlbaum Associates, Mahwah, New Jersey.

Picard, R.W., "Affective computing," M.l.T Media Laboratory Perceptual Computing Section Technical Report No. 321, 1995, pp. 1-16, United States.

Taboada, M. et al., "Lexicon-based methods for sentiment analysis," Association for Computational Linguistics, Jun. 2011, pp. 267-307, vol. 37, No. 2, MIT Press Journal, United States.

Xu, A., et al., "A New Chatbot for Customer Service on Social Media," Proceedings of the 2017 CHI Conference on Human Factors in Computing Systems, May 2017, pp. 1-6, ResearchGate, United States.

List of IBM Patents or Applications Treated as Related: Yin, P. et al., U.S. Appl. No. 16/144,969, filed Sep. 27, 2018.

* cited by examiner

MACHINE LEARNING FROM TONE ANALYSIS IN ONLINE CUSTOMER SERVICE

BACKGROUND

Due to the popularity of social media, e.g., TWITTER®, many companies set-up official accounts to provide online customer service. Unlike a conventional telephone call, customers and agents interact asynchronously via the web, e.g., publish tweets and '@' the particular account. While there is more convenience, customers tend to be quite emotional via an online help desk. Besides providing a correct solution for the problem, it is equally important for online customer agents to properly pacify emotions.

SUMMARY

Embodiments relate to analyzing tone in online customer service. One embodiment provides a method that includes receiving adjusted labeled data based on emotional tone factors. Words are analyzed using a tone latent Dirichlet allocation (T-LDA) model that models tone intensity using the emotional tone factors and integrating the adjusted labeled data. Representative words are provided for each emotional tone factor based on using the T-LDA model. The representative words are obtained using the T-LDA model based on determining posterior probabilities and adjusting the posterior probabilities based on an auxiliary topic.

These and other features, aspects and advantages of the present embodiments will become understood with reference to the following description, appended claims and accompanying figures.

DETAILED DESCRIPTION

Figure 1:
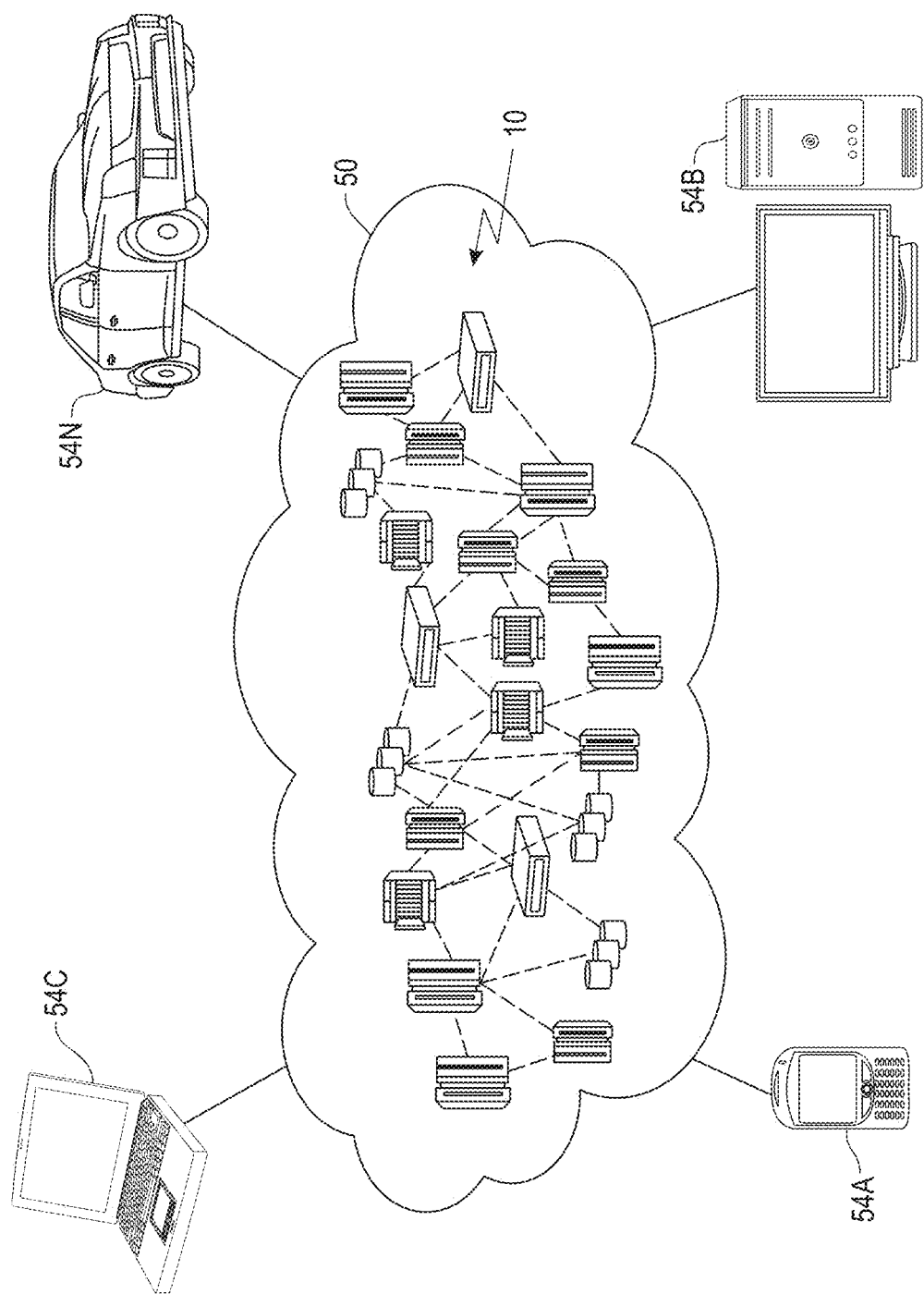
FIG. 1 depicts a cloud computing environment, according to an embodiment.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is understood in advance that although this disclosure includes a detailed description of cloud computing, implementation of the teachings recited herein are not limited to a cloud computing environment. Rather, embodiments are capable of being implemented in conjunction with any other type of computing environment now known or later developed.

Embodiments relate to tone analysis and learning for online customer service. One embodiment provides a method that includes crawling a network for raw data. Emotion metrics are refined for the raw data. Labels for the raw data using refined emotion metrics are received. Factor analysis is performed for labeled data to obtain emotional tone factors. Adjusted labeled data are received based on the emotional tone factors. Words are analyzed using a tone model using the emotional tone factors and integrating the adjusted labeled data. Representative words for each emotional tone factor are provided based on using the tone model.

Cloud computing is a model of service delivery for enabling convenient, on-demand network access to a shared pool of configurable computing resources (e.g., networks, network bandwidth, servers, processing, memory, storage, applications, virtual machines (VMs), and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed and automatically, without requiring human interaction with the service's provider.

Broad network access: capabilities are available over a network and accessed through standard mechanisms that promote use by heterogeneous, thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or data center).

Rapid elasticity: capabilities can be rapidly and elastically provisioned and, in some cases, automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported, thereby providing transparency for both the provider and consumer of the utilized service.

Service Models are as follows:

Software as a Service (SaaS): the capability provided to the consumer is the ability to use the provider's applications running on a cloud infrastructure. The applications are accessible from various client devices through a thin client interface, such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is the ability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is the ability to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is a service oriented with a focus on statelessness, low coupling, modularity, and semantic interoperability. At the heart of cloud computing is an infrastructure comprising a network of interconnected nodes.

Referring now to FIG. 1, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N can communicate. Nodes 10 can communicate with one another. They can be grouped (not shown) physically or virtually, in one or more networks, such as private, community, public, or hybrid clouds as described hereinabove, or a combination thereof. This allows the cloud computing environment 50 to offer infrastructure, platforms, and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
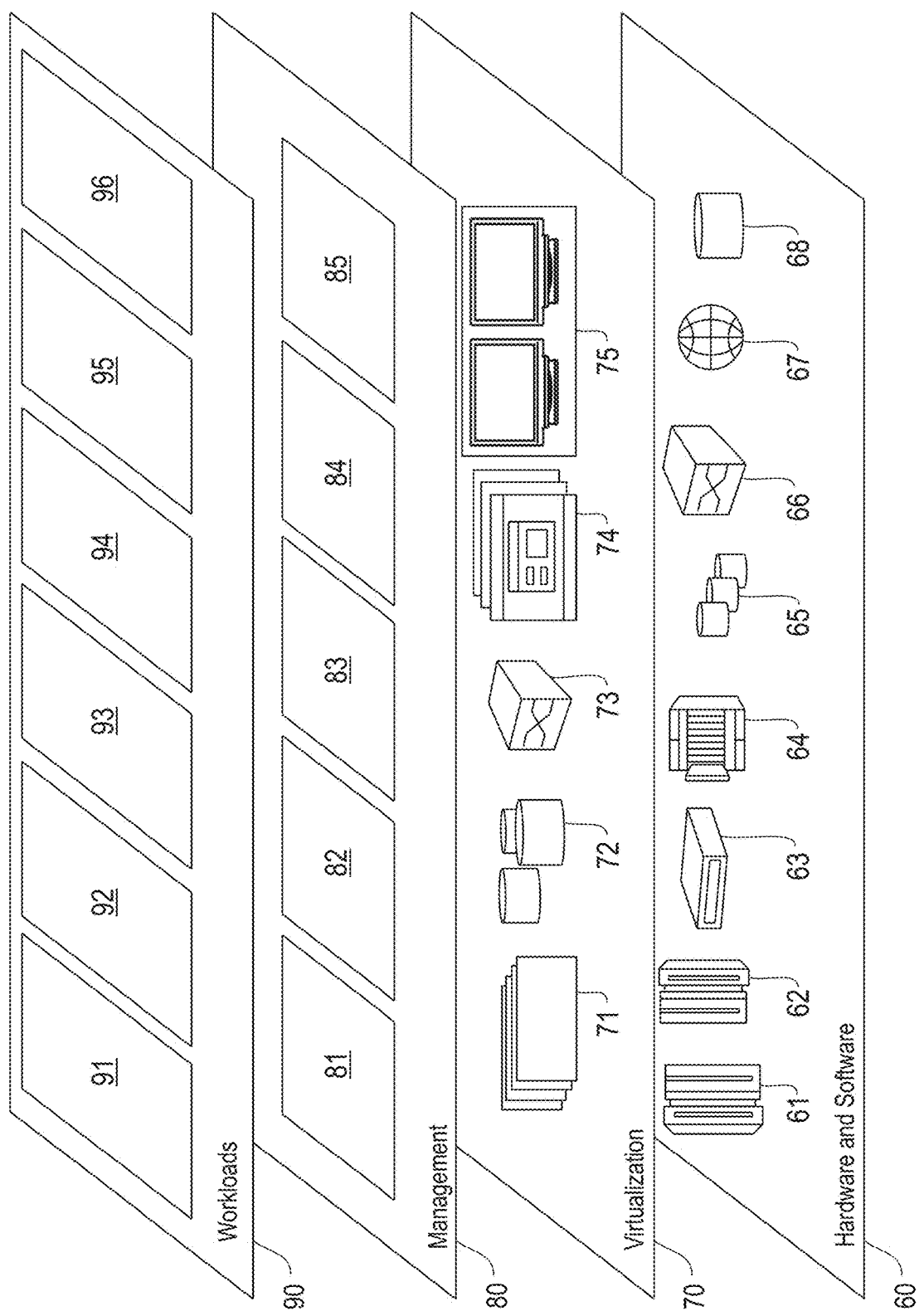
FIG. 2 depicts a set of abstraction model layers, according to an embodiment.

Referring now to FIG. 2, a set of functional abstraction layers provided by the cloud computing environment 50 (FIG. 1) is shown. It should be understood in advance that the components, layers, and functions shown in FIG. 2 are intended to be illustrative only and embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities can be provided: virtual servers 71; virtual storage 72; virtual networks 73, including virtual private networks; virtual applications and operating systems 74; and virtual clients 75.

In one example, a management layer 80 can provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment and billing or invoicing for consumption of these resources. In one example, these resources can comprise application software licenses. Security provides identity verification for cloud consumers and tasks as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment can be utilized. Examples of workloads and functions which can be provided from this layer include: mapping and navigation 91; software development and lifecycle management 92; virtual classroom education delivery 93; data analytics processing 94; transaction processing 95; and tone analysis and learning for online customer service processing 96. As mentioned above, all of the foregoing examples described with respect to FIG. 2 are illustrative only, and the embodiments are not limited to these examples.

It is understood all functions of one or more embodiments as described herein can be typically performed by the processing system 300 (FIG. 3) or the cloud environment 410 (FIG. 4), which can be tangibly embodied as hardware processors and with modules of program code. However, this need not be the case for non-real-time processing. Rather, for non-real-time processing the functionality recited herein could be carried out/implemented and/or enabled by any of the layers 60, 70, 80 and 90 shown in FIG. 2.

It is reiterated that although this disclosure includes a detailed description on cloud computing, implementation of the teachings recited herein are not limited to a cloud computing environment. Rather, the embodiments can be implemented with any type of clustered computing environment now known or later developed.

Figure 3:
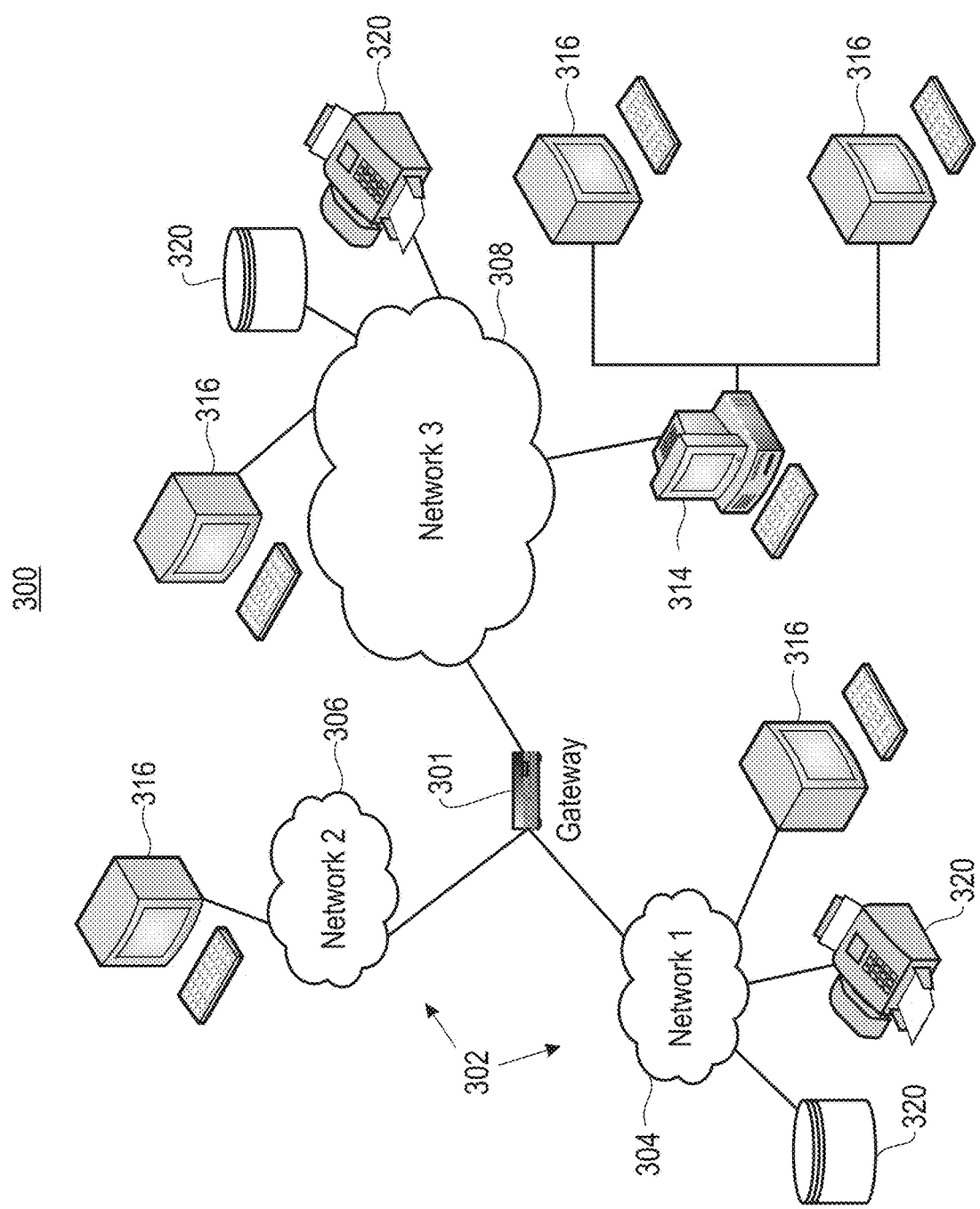
FIG. 3 is a network architecture of tone analysis and learning for an online customer service system, according to an embodiment.

FIG. 3 is a network architecture 300 of tone analysis and learning for an online customer service system, according to an embodiment. As shown in FIG. 3, a plurality of remote networks 302 are provided, including a first remote network 304 and a second remote network 306. A gateway 301 can be coupled between the remote networks 302 and a proximate network 308. In the context of the present network architecture 300, the networks 304, 306 can each take any form including, but not limited to, a LAN, a WAN, such as the Internet, public switched telephone network (PSTN), internal telephone network, etc.

In use, the gateway 301 serves as an entrance point from the remote networks 302 to the proximate network 308. As such, the gateway 301 can function as a router, which is capable of directing a given packet of data that arrives at the gateway 301, and a switch, which furnishes the actual path in and out of the gateway 301 for a given packet.

Further included is at least one data server 314 coupled to the proximate network 308, which is accessible from the remote networks 302 via the gateway 301. It should be noted that the data server(s) 314 can include any type of computing device/groupware. Coupled to each data server 314 is a plurality of user devices 316. Such user devices 316 can include a desktop computer, laptop computer, handheld computer, printer, and/or any other type of logic-containing device. It should be noted that a user device 316 can also be directly coupled to any of the networks in some embodiments.

A peripheral 320 or series of peripherals 320, e.g., facsimile machines, printers, scanners, hard disk drives, networked and/or local storage units or systems, etc., can be coupled to one or more of the networks 304, 306, 308. It should be noted that databases and/or additional components can be utilized with, or integrated into, any type of network element coupled to the networks 304, 306, 308. In the context of the present description, a network element can refer to any component of a network.

According to some approaches, methods and systems described herein can be implemented with and/or on virtual systems and/or systems, which emulate one or more other systems, such as a UNIX® system that emulates an IBM® z/OS environment, a UNIX® system that virtually hosts a MICROSOFT® WINDOWS® environment, a MICROSOFT® WINDOWS® system that emulates an IBM® z/OS environment, etc. This virtualization and/or emulation can be implemented through the use of VMWARE® software in some embodiments.

Figure 4:
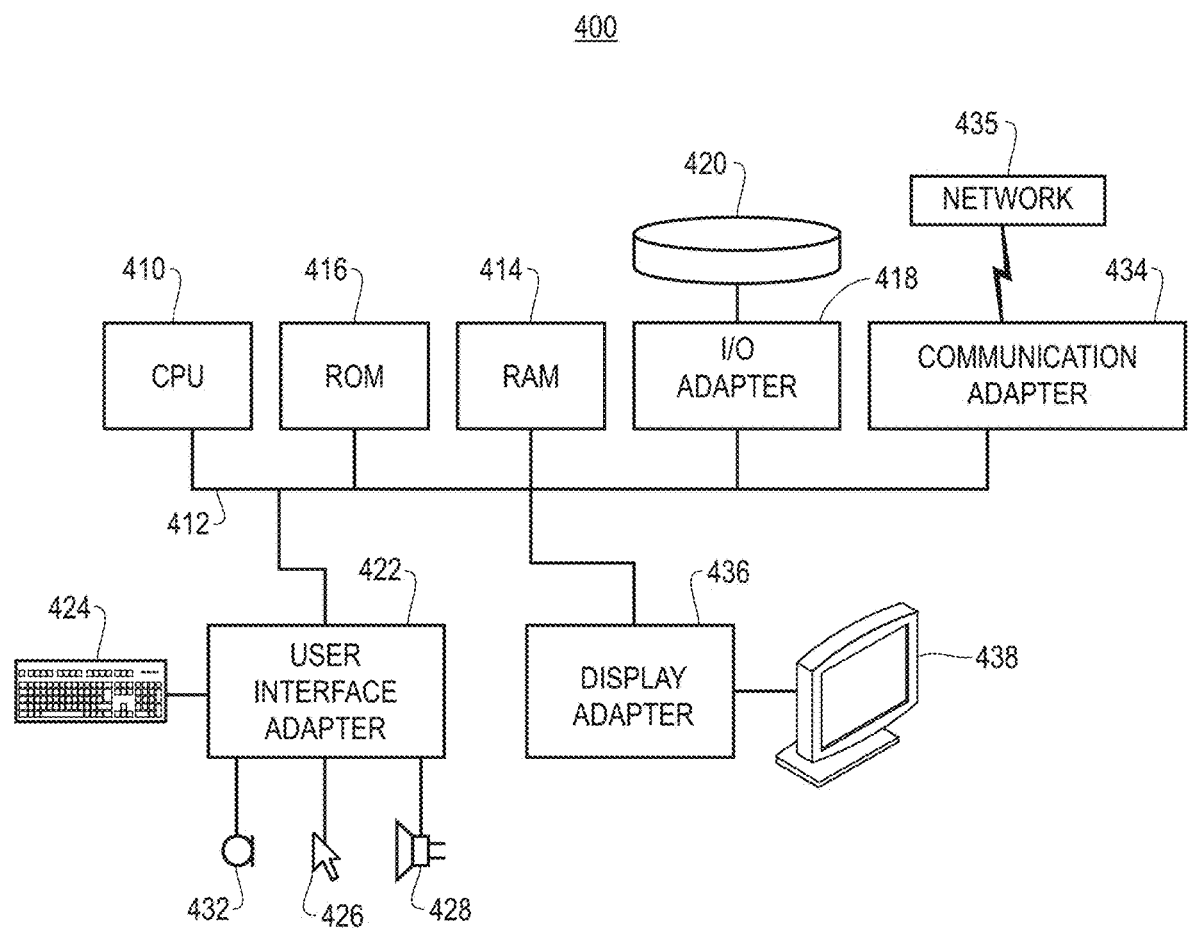
FIG. 4 shows a representative hardware environment that can be associated with the servers and/or clients of FIG. 1, according to an embodiment.

FIG. 4 shows a representative hardware system 400 environment associated with a user device 316 and/or server 314 of FIG. 3, in accordance with one embodiment. In one example, a hardware configuration includes a workstation having a central processing unit 410, such as a microprocessor, and a number of other units interconnected via a system bus 412. The workstation shown in FIG. 4 can include a Random Access Memory (RAM) 414, Read Only Memory (ROM) 416, an I/O adapter 418 for connecting peripheral devices, such as disk storage units 420 to the bus 412, a user interface adapter 422 for connecting a keyboard 424, a mouse 426, a speaker 428, a microphone 432, and/or other user interface devices, such as a touch screen, a digital camera (not shown), etc., to the bus 412, communication adapter 434 for connecting the workstation to a communication network 435 (e.g., a data processing network) and a display adapter 436 for connecting the bus 412 to a display device 438.

In one example, the workstation can have resident thereon an operating system, such as the MICROSOFT® WINDOWS® Operating System (OS), a MAC OS®, a UNIX® OS, etc. In one embodiment, the system 400 employs a POSIX® based file system. It will be appreciated that other examples can also be implemented on platforms and operating systems other than those mentioned. Such other examples can include operating systems written using JAVA®, XML, C, and/or C++ language, or other programming languages, along with an object oriented programming methodology. Object oriented programming (OOP), which has become increasingly used to develop complex applications, can also be used.

Figure 5:
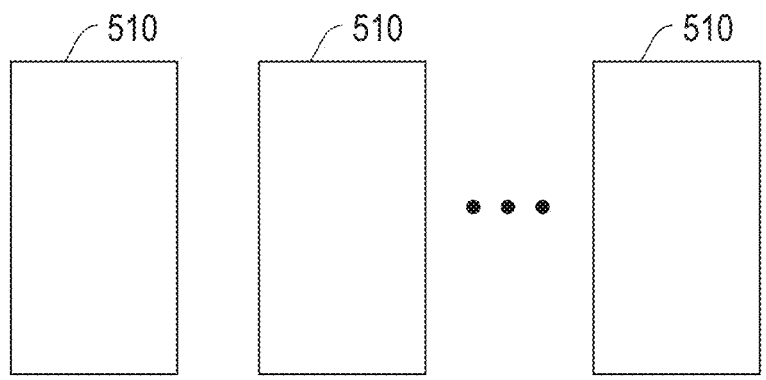
FIG. 5 is a block diagram illustrating a distributed system that can be employed for tone analysis and learning for online customer service, according to one embodiment.
Figure 5:
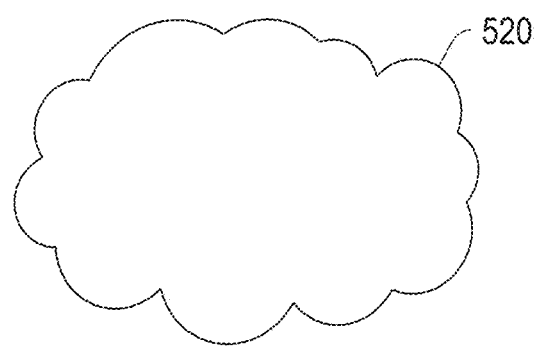
Figure 5:
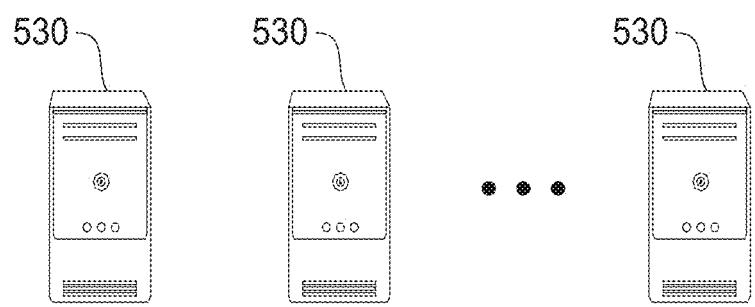

FIG. 5 is a block diagram illustrating a distributed system 500 that can be employed for tone analysis and learning for an online customer service, according to one embodiment. In one embodiment, the system 500 includes client devices 510 (e.g., mobile devices, smart devices, computing systems, etc.), a cloud or resource sharing environment 520 (e.g., a public cloud computing environment, a private cloud computing environment, a datacenter, etc.), and servers 530. In one embodiment, the client devices are provided with cloud services from the servers 530 through the cloud or resource sharing environment 520.

Tone analysis benefits online customer service in at least three ways: i) understanding the user behavior in context of online customer service, ii) providing training materials for online customer service agents, and iii) shedding insight in the development of human-like auto-response bots. There are two major emotion metrics conventionally used. In the first emotion metrics, five major categories are used, i.e., anger, sadness, joy, disgust, and fear. In the second emotion metrics, a six-dimensional metric is used, including: calm, alert, sure, vital, kind, and happy. However, in context of customer service, neither one of the conventional metrics fit. For example, showing empathy is a usual strategy of these customer service agents to comfort a complaining customer. But it is not captured by either of the conventional metrics. To understand the emotion information for online customer service conversation, in one embodiment system 500 employs eight new metrics that are collected and labeled top describe emotional information for both customers and agents. These eight metrics are: anxious, excited, frustrated, impolite, polite, sad, satisfied, and sympathetic. These new metrics are reference herein as "Tone."

In one embodiment, system 500 collects and labels online conversations of online customer service, such as on TWITTER®, or any other online customer service system. To better explain each tone metric, system 500 extends or modifies the Latent Dirichlet Allocation (LDA) model to a Tone LDA (T-LDA) model. In one embodiment, in T-LDA each latent topic is explicitly associated with one of three semantic categories, i.e., tone-related, domain-specific and auxiliary. With partially-labeled data, T-LDA is able to identify representative words and thus build lexicon profiles for each tone. To understand each tone with labeled data, there are two main issues. The first one is how to handle disagreement labels. In the label process, to mitigate bias, each textual utterance (e.g., TWEET®, etc.) is labeled by multiple people and the average is used as the true label. However, system 500 also considers the variance. For instance, two textual utterances with the same average intensity label should be treated different if they have different variance. In one embodiment, system 500 employs an adjustment strategy for the label considering factors such as average, variance and number of people who label it. The second issue is how to model the label data to help understand the tone. Particularly, given one tone, it is necessary to know what are its representative words. One natural way is to model it as a regression task with the labeled data. However, training on the raw bag-of-word feature may be quite noisy. In a sentence, each word may be related to tone, or related to the semantic, or is just an auxiliary word. Another method is to use latent topic modeling, e.g., LDA. But it is an unsupervised method and the learned latent topic may not be associated with tone. There are a few conventional systems that integrate classification labels into LDA. However, they do not fit the scenario where the label is not binary, but instead continuous values. To address this issue, in one embodiment system 500 employs the T-LDA model. In one embodiment, the T-LDA model is essentially a generative model and follows a similar generative process with LDA. However, each latent topic has an explicit semantic meaning, falling into one of three categories: tone-related, domain-specific and auxiliary. The first category aims to capture words that are highly associated with tone. The second one is to find words that are exclusive to a specific domain. In one example embodiment, each domain corresponds to a company. Finally, the auxiliary topic contains meaningless words. Note that the found words are not equivalent to conventional "stop words." System 500 also includes those words that have a high frequency of appearance but are not related to either tone or domain. For example, the word "account" may appear in many areas such as bank, mobile carrier, online shopping, etc., and thus it becomes a common "meaningless" word that is representative of none.

In one embodiment, system 500 uses a design that is especially helpful in the goal to analyze tone. In one embodiment, in system 500 among these three categories of topics, the tone-related ones are fully known after human labeling the tone intensity. The domain-specific ones are partially known, because system 500 is only aware of which domain (e.g., company) the textual utterance or document (e.g., TWEET®) belongs to but not the intensity. Finally, the auxiliary is fully unknown. Thus the learning is a hybrid of a supervised and an unsupervised one. In one embodiment, system 500 uses an Expectation-Maximization (EM) algorithm to train the learning model.

Figure 6:
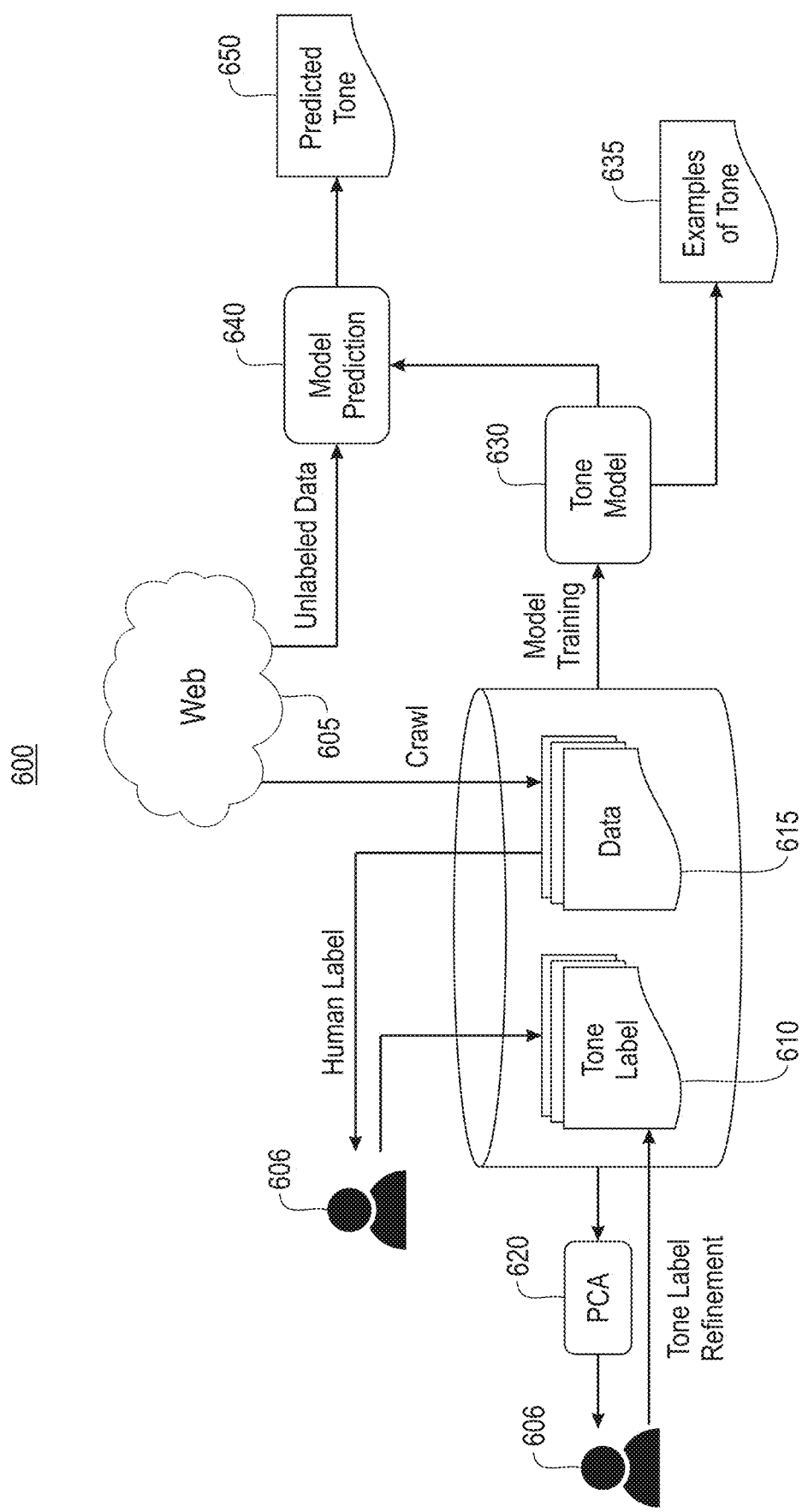
FIG. 6 illustrates an example architecture for tone analysis and learning for an online customer service system, according to one embodiment.

FIG. 6 illustrates an example architecture 600 for tone analysis and learning for online customer service, according to one embodiment. In one embodiment, the architecture 600 includes the web or Internet (or other network) 605 for obtaining unlabeled data. The architecture 600 crawls the web 605 and obtains data (textual) 615, which is labeled by a human 606 and stored as tone label (data) 610. The tone label (data) 610 is processed using principal components analysis (PCA) and the human 606 refines the tone labels that are stored as tone label (data) 610. The architecture 600 trains the tone model 630 that outputs examples of tone 635 and are input into model prediction processing 640, which outputs the predicted tone 650. In general, for a bottom-up analysis, in one embodiment there are three steps: data crawling, metric identification and tone labeling. The first step is to crawl raw textual (e.g., TWEET®) data, the second is to identify proper metrics and the final step is to label data with the defined tone.

In one embodiment, in the architecture 600 data crawling is used to study tones involved in the customer service domain. For example, multiple brands may be selected (e.g., intentionally selecting 62 brands, etc.) with dedicated customer service accounts on a platform (e.g., TWITTER®), which covers a large variety of industries, geographical locations and organization scales. The conversational data is collected by capturing both the brands' textual utterances (e.g., TWEETS®) and textual utterances mentioning each of the brands using a streaming application programming interface (API). Conversations are reconstructed based on the "in_reply_to_status_id" and "in_reply_to_user_id" elements of the responses. In some embodiments, millions of user requests are collected. The collected conversations occur during a selected time period, such as between Jun. 1, 2016 and Aug. 1, 2016. In one embodiment, some preprocessing is performed on the collected dataset, for example: keeping only those conversations received at least one reply and involved only one customer and one agent. In some embodiments, all non-English conversations or conversations containing requests or answers with images are also removed from the dataset. In one example, after data cleaning, there could be 14,118 conversations, 71,171 conversational TWEETS® with 31 brands.

In one embodiment, for tone identification, a set of (e.g., 53, etc.) emotional metrics (including aggressive, sincere, apologetic, relieved, sad, etc.) are pre-selected drawing from a number of literatures across different domains, such as marketing, linguistic, and psychology. In one example, for human label using a human 606 in-the-loop, randomly sampled conversations (e.g., 500, or about 2500 TWEETS®, etc.) from the collected dataset are used and crowd workers (e.g., from CROWDFLOWER®) are asked to rate the extent to which these emotional metrics can best describe the selected conversations. To be more specific, workers are required to annotate on a conversation level, labeling all samples (e.g., TWEETS®) involved in a conversation. To preserve privacy, we replace all the @mentions appeared in each conversation as @customer, @[industry]_company (e.g. @ecommerce_company, @telecommunication_company), @com-petitor_company, and @other_users. For labeling, workers are asked to indicate on a 4-point Likert scale, ranging from "Very strongly" to "Not at all." Advantages of using Likert scale over binary yes/no include: higher tolerance for diverse perceptions and less sparsity for generated labels. Each conversation was labeled by, for example, five different crowd workers. In one example, the workers are restricted to be U.S. residents as well as maintaining some moderate level of accuracy in their previous annotation tasks. Validation questions are embedded in the real tasks to validate the quality of collected labels. The collected ratings are reliably aggregated via a reference-based process.

In one embodiment, PCA 620 processing is performed on the labeled data. The PCA 620 of the attributes (e.g., 53 metrics, etc.) reveals a highly interpretable eight-dimensional solution, whose eigenvalues are greater than one. By analyzing the contribution of the attributes in each component, in one embodiment the eight emotional factors are summarized as: anxious, excited, frustrated, impolite, polite, sad, satisfied, and sympathetic. With eight identified tones, in one example embodiment crowd workers are asked to annotate the extent to which each of the tone is demonstrated in a textual utterance (e.g., TWEET®) on the, for example, 71,171 collected TWEETS®. The process is the same as the annotating original metrics (e.g., 53 metrics, etc.). In one example, after processing there are 23,785 with non-zero anxious, 30,715 excited, 20,717 frustrated, 9,251 impolite, 63,434 polite, 30,439 sad, 22,758 satisfied, and 31,289 sympathetic.

To facilitate modeling, usually the raw textual file is converted to bag-of-word feature vector. In one embodiment, a natural language processing (NLP) parser (e.g., a Sandford NLP, etc.) is employed to perform the word segmentation and part-of-speech tags. Additionally, a few heuristic rules are used to reserve particular word types in a textual utterance (e.g., TWEET®) such as name, hash tag, number sequence, emotion icon and word of negation. In TWITTER®, user name has a prefix of "@" and hash tag of "#." In preprocessing, the name is used to identify different customer support accounts, which then become the identifier of a Domain-specific topic for an auxiliary tone model described below. The hash tag is removed because it is a typical characteristic of TWITTER® and may bias the tone model 630.

In customer support's response, a telephone number is sometimes provided for the user. This information is a strong Domain-specific signal. Such number sequence is sometimes segmented by the parser. To avoid this case, in on embodiment heuristic pattern match is applied to extract possible phone numbers in the whole sentence before segmentation. The list of patterns is shown below.

| [1.]xxx.xxx.xxxx | [1-](xxx)[-]xxx - xxxx |
| [1-]xxx - xxx - xxxx | [1-]xxx xxx xxxx | where the x represents any number digits from 0 to 9, and content in square parenthesis stands for "optional" when matching patterns.

Sometimes negative words are used to represent opposite meaning. For example, " . . . is not helpful," " . . . hasn't yet arrived." Using a bag-of-word feature after segmentation, such information would be lost. Therefore, in one embodiment the architecture 600 uses the parser's part-of-speech (POS) tag to detect negation, then converts the next noun/adjective/verb to a negative format, e.g., "neg_helpful," "neg_arrived." Such negative format is treated as a unique word in the feature space.

In TWITTER®, some users would like to use emotion icons when publishing a TWEET®. They are short and concise but contains emotional information. For example, ":)" represents a smile, ":(" means sad, "T_T" represents crying. Each icon may be correlated with tone and thus in one embodiment the architecture 600 treats icons as a unique word. In one embodiment, the architecture 600 preprocess each textual utterance (e.g., a TWEET®) via a string match based on a lexicon in, for example, WIKIPEDIA® to label these emotion icons.

In some cases, multiple punctuation, especially a question mark (?) and an exclamation mark (!) are used together. For example, "it's awesome!!!," "Things that used to be $129 are now $128!!!! ??????," etc. Such repeated punctuation may have a different meaning from a single one. In one embodiment, the architecture 600 transforms repeated punctuation to "!_rep" and "?_rep" and treat them as two unique words.

One issue when processing human-labeled data is how much should these labels be trusted. This issue is worth more attention especially when one item is labeled by multiple people and the results are quite different. For discrete choice of strength, e.g., ratings, one common method is to calculate the mean value and use it as a ground-truth label. One weakness of this method is that it fails to consider divergence. Consider two such scenarios: i) two people label the item as degree of 2, ii) one person labels it as degree of 1, while the other degree of 3. The mean value in both cases are the same. However, the divergence is different. Apparently the first one receives more agreement and should be more reliable. In one embodiment, the architecture 600 adopts a statistic method to adjust the labels. Intuitively, the true label of an item is the average value among all people. Obviously it is impossible to obtain such value since it is unrealistic to ask all people to label an item. Instead, a few people are randomly sampled to do the task, and the goal is to infer the real one from sampled values. In one embodiment, an assumption is made that, by default, the tone label of an item is neural (degree of 0) unless there is a strong evidence. That means a mechanism is needed to decay the sample average. This assumption complies with a goal of finding representative words for each tone. If there is big divergence, it suggests ambiguity and thus is not representative. Formally, let s denote the number of people labeling the item and $\hat{\mu}$, $\hat{\sigma}^2$ the average and variance of the labels respectively. The sample average $\hat{\mu}$ is decayed by the probability that it is no smaller than 0. With central limit theory, it is known that the sample average satisfies a Gaussian distribution, i.e., $\hat{\mu} \sim \mathcal{N}(\mu, \sigma^2/s)$, where $\mu$, $\sigma^2$ are the average and variance over the whole population. The adjustment can be written by the following equation.

$$\tilde{\mu} = \hat{\mu} \cdot P(\hat{\mu} \le 0 \mid \mu, \sigma^2, s) = \qquad (1)$$

$$\hat{\mu} \int_0^{+\infty} \frac{\sqrt{s}}{\sqrt{2\pi}\,\sigma} e^{-\frac{s(x-\mu)^2}{2\sigma^2}} dx \approx \hat{\mu} \int_0^{+\infty} \frac{\sqrt{s}}{\sqrt{2\pi}\,\hat{\sigma}} e^{-\frac{s(x-\hat{\mu})^2}{2\hat{\sigma}^2}} dx =$$

$$\hat{\mu}\left(1 - \Phi\left(-\frac{\hat{\mu}}{\hat{\sigma}}\sqrt{s}\right)\right)$$

where the $\Phi(\cdot)$ represents the cumulative density function for standard Gaussian distribution (mean 0, variance 1). As can be seen from Equation (1), the discount $$1 - \Phi\left(-\frac{\hat{\mu}}{\hat{\sigma}}\sqrt{s}\right)$$

ranges from 0 to 1 and involves three factors: sample mean $\hat{\mu}$, variance $\hat{\sigma}^2$ and size s. Generally, small sample mean has a small discount. This design is consistent with the assumption that it is tended to believe neural tone (label 0) unless there is strong evidence. Similarly, small sample size leads to a small ratio, indicating that reliability is associated proportional to the number of people labeling the item. Finally, the variance is negatively correlated with discount, where small value results in decay ratio close to 1 and vice versa. Particularly, if the variance is 0 (all people choose the same label), there is no decay for the sample mean.

Figure 7:
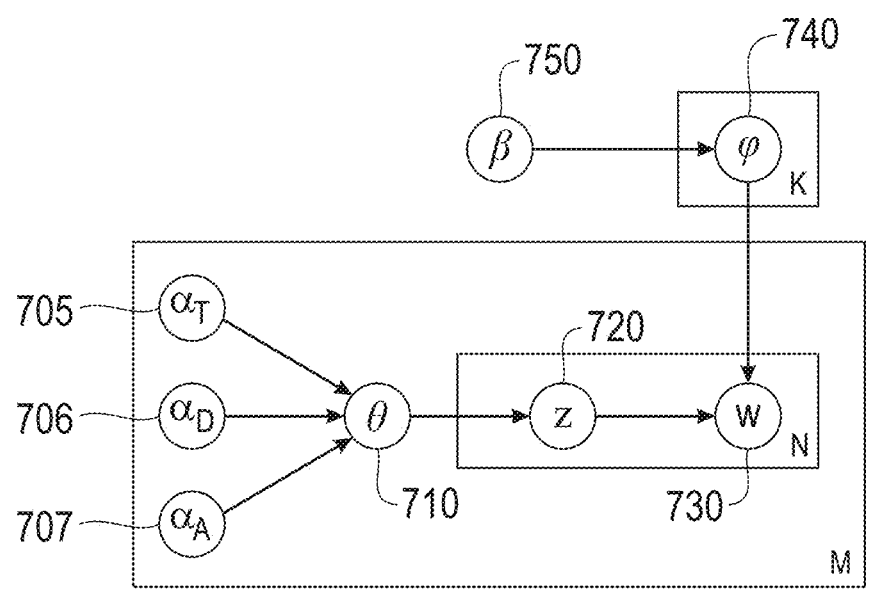
FIG. 7 illustrates an example graphic representation of an architecture for a tone latent Dirichlet allocation (T-LDA) model, according to one embodiment.

FIG. 7 illustrates an example graphic representation of an architecture for a T-LDA model 700, according to one embodiment. The T-LDA model 700 originates from latent topic modeling, and its generative process follows that of LDA. However, by integrating the label information, the T-LDA model 700 is guided to converge toward the desired direction. For clarity, the symbols and their meanings are listed in Table 1. Observations are represented as white and latent variables are represented as gray. Partially observed variables are represented as half white and half gray. Topic density for tone-related is represented as $\alpha_T$ 705, domain-specific topics are represented as $\alpha_D$ 706, and auxiliary topics are represented as $\alpha_A$ 707. Prior Dirichlet distribution parameter for topic-word vector is represented as $\beta$ 750.

Word distribution for $k^{th}$ topic is represented as $\varphi_k$ 740. Topic distribution vector of the document is represented as $\theta$ 710. Latent topic index for each word in each document is represented as z 720. The total number of words in the whole dataset is represented as W 730.

TABLE 1

| Symbol | Dimension | Description |
| --- | --- | --- |
| M | 1 | Number of documents |
| N | 1 | Number of words in a document |
| W | 1 | Total number of words in the whole data set |
| T, D, A | Set | Tone-related, Domain-specific and Auxiliary topics |
| K = \|T\| + \|D\| + \|A\| | 1 | Total number of topics |
| i, j, k | 1 | Index for document, word and topic |
| $\alpha_T^i, \alpha_D^i, \alpha_A^i$ | vector of \|T\|, \|D\|, \|A\| | Topic density of Tone-related, Domain-specific and Auxiliary topics for $i^{th}$ document |
| $\beta$ | 1 | Prior Dirichlet distribution parameter for topic-word vector |
| $\varphi_k$ | Vector of W | Word distribution for $k^{th}$ topic |
| $\theta_i$ | Vector of K | Topic distribution vector for $i^{th}$ document |
| $z_{ij}$ | 1 | Topic index for $j^{th}$ word in $i^{th}$ document |

Generally, the latent topic modeling has a discrete space of latent topic, and each latent topic is represented by a distribution over word space. In T-LDA model 700, there are in total three types of topics by design, and not all of them are latent. The first one is tone-related topic, which is known because of human labeling. The second is domain-specific topic, aiming to capture the frequent words for different domains. Finally there is one auxiliary topic, related to words that support a grammar-correct sentence.

In one embodiment, the tone-related topic density $\alpha_T$ 705 and the word W 730 are the only known variables. Particularly, the domain-specific topic density $\alpha_D$ 706 is represented as half-white, suggesting that it is partially known. The reason is that for each document it is known which domain it belongs to, but the density is unknown and needs to be learned from data. In other words, it is known whether the $\alpha_D$ 706 is zero or not but have no idea of the specific value if it is non-zero. Algorithm 1 below describes the generative process.

Algorithm 1 T-LDA Generative Process

```
1:  for Each topic do
2:      choose φ_k ~ Dir([β ... β]/W) Dirichlet distribution
3:  end for
4:  for Each document do
5:      choose θ_i ~ Dir((α^i, α^i, α^i))
6:      for Each word in the document do
7:          choose zi j    Multinomial θi °
8:          choose w       Dir φzi j
9:      end for
10: end for
```

In one embodiment, firstly a prior Dirichlet parameter $\beta$ 750 generates word-distribution vectors $\varphi$ 740 for each topic. Also, each document has its topic density, which generates a topic-distribution vector $\theta$ 710 with a Dirichlet distribution. Then for each word a latent variable Z 720 is generated according to $\theta$ 710. The latent variable Z 720 indicates which topic is used to generate the next word. Finally, the chosen topic generates a word W 730 based on the corresponding word-distribution vector.

The T-LDA model 700 is learned by maximizing the posterior log-likelihood. Formally, let $\mathcal{D}$ and $\alpha_T$ 705 denote the corpus and corresponding tone labels, and $\Theta = \langle \varphi, \alpha_D, \alpha_A \rangle$ (705, 706 and 707) the collection of model parameters, the posterior log-likelihood can be written as below.

$$\log P(\Theta \mid \mathcal{D}, \alpha_T, \beta) = \quad (2)$$

$$\log P(\mathcal{D} \mid \Theta, \alpha_T) + \log P(\Theta \mid \alpha_T, \beta) - \log P(\mathcal{D} \mid \alpha_T) \propto$$

$$\log P(\mathcal{D} \mid \Theta, \alpha_T) + \log P(\Theta \mid \alpha_T, \beta) =$$

$$\sum_{i,j} \log P(w_{ij}, z_{ij} \mid \Theta, \alpha_T) + \log P(\varphi \mid \beta) =$$

$$\sum_{i,j} \log \int P(w_{ij}, z_{ij}, \theta_i \mid \Theta, \alpha_T) d\theta_i + \sum_k \log P(\varphi_k \mid \beta) =$$

$$\sum_{i,j} \log \left( \int P(w_{ij}, z_{ij} \mid \theta_i, \varphi) \cdot P(\theta_i \mid \alpha_T^i, \alpha_D^i, \alpha_A^i) d\theta_i \right) +$$

$$\sum_k \log P(\varphi_k \mid \beta)$$

where the data probability $P(\mathcal{D})$ is skipped as it is a constant value free of unknown parameters. The topic-word distribution $\varphi_k$ 740 is determined by a prior Dirichlet distribution, thus the probability $P(\varphi_k \mid \beta)$ is shown below $$\log P(\varphi_k \mid \beta) \propto \log \left( \prod_w (\varphi_k(w))^{\beta-1} \right) = (\beta - 1) \sum_w \log \varphi_k(w) \quad (3)$$

Again the parameter-free constant is omitted. Note that by design each single word $w_{ij}$ is generated by only one topic. A binary variable $\eta_{ij}^k \in \{1,0\}$ is introduced that indicates whether the word $w_{ij}$ is generated by $k^{th}$ topic. In this case, the integral in Equation (2) can be rewritten as below.

$$\int P(w_{ij}, z_{ij} \mid \theta_i, \varphi) \cdot P(\theta_i \mid \alpha_T^i, \alpha_D^i, \alpha_A^i) d\theta_i = \quad (4)$$

$$\prod_k \left( \int P(w_{ij}, z_{ij} = k \mid \theta_i, \varphi) \cdot P(\theta_i \mid \alpha_T^i, \alpha_D^i, \alpha_A^i) d\theta_i \right)^{\eta_{ij}^k} =$$

$$\prod_k \left( P(w_{ij} \mid \varphi_k) \int P(z_{ij} = k \mid \theta_i) \cdot P(\theta_i \mid \alpha_T^i, \alpha_D^i, \alpha_A^i) d\theta_i \right)^{\eta_{ij}^k} =$$

$$\prod_k \left( \varphi_k(w_{ij}) \int \theta_i(k) P(\theta_i \mid \alpha_T^i, \alpha_D^i, \alpha_A^i) d\theta_i \right)^{\eta_{ij}^k}$$

Now the integral is to calculate the expected value of $k^{th}$ element in vector $\theta_i$ 710, which is a random variable satisfying Dirichlet distribution. Based on the probability density function, the expected value is computed as shown below.

$$E(\theta_i(k))_{\theta_i \sim Dir(\langle \alpha_T^i, \alpha_D^i, \alpha_A^i \rangle)} = \int \theta_i(k) P(\theta_i \mid \alpha_T^i, \alpha_D^i, \alpha_A^i) d\theta_i = \quad (5)$$

$$\frac{1_{k \in \alpha_T^i} \alpha_T^i(k) + 1_{k \in \alpha_D^i} \alpha_D^i(k) + 1_{k \in \alpha_A^i} \alpha_A^i(k)}{\sum \alpha_T^i + \sum \alpha_D^i + \sum \alpha_A^i}$$

where $1_{k \in \alpha_*^i}$ is an indicator suggesting whether the $k^{th}$ topic belongs to the particular topic category, i.e., Tone-related (T), Domain-specific (D) or Auxiliary (A).

By connecting all of these pieces, the objective function $L(\Theta)$ is defined as shown below:

$$\mathcal{L}(\Theta) = \sum_{i,j} \log \left( \int P(w_{ij}, z_{ij} \mid \theta_i, \varphi) \cdot P(\theta_i \mid \alpha_T^i, \alpha_D^i, \alpha_A^i) \right) d\theta_i + \quad (6)$$

$$(\beta - 1) \sum_w \log \varphi_k(w) =$$

$$\sum_{i,j,k} \eta_{ij}^k \left( \log \varphi_k(w_{ij}) + \log \sum_{\tau \in \{D,A\}} 1_{k \in \alpha_\tau^i} \alpha_\tau^i(k) - \log \sum_{\tau \in \{T,D,A\}} \alpha_\tau^i \right) +$$

$$(\beta - 1) \sum_{k,w} \log \varphi_k(w)$$

The model parameters are learned via maximize the log-likelihood, $$\text{i.e., } \Theta^* = \arg \max_\Theta \mathcal{L}(\Theta)$$

with constraint $\forall k, \Sigma_w \varphi_k(w) = 1$. However, it is impossible to get the explicit solution due to the existence of unknown variable $\eta_{ij}^k$. Thus the Expectation-Maximization (EM) is used by the T-LDA model 700 to solve it.

In one embodiment, first the expected value of $\eta_{ij}^k$ with a current parameter is computed. Formally, let $\Theta^{(t)}$ denote the parameter value at $t^{th}$ iteration. The expected value $E(\eta_{ij}^k)_{\Theta^{(t)}}$ is computed as below.

$$E(\eta_{ij}^k)_{\Theta^{(t)}} = 1 \cdot P(\eta_{ij}^k = 1 \mid \Theta^{(t)}, \mathcal{D}) + 0 \cdot P(\eta_{ij}^k = 0 \mid \Theta^{(t)}, \mathcal{D}) = \quad (7)$$

$$\frac{P(w_{ij} \mid z_{ij} = k, \varphi_k^{(t)}) P(z_{ij} = k \mid \alpha_*^{i(t)})}{\sum_{k'} P(w_{ij} \mid z_{ij} = k', \varphi_{k'}^{(t)}) P(z_{ij} = k' \mid \alpha_*^{i(t)})} =$$

$$\frac{\varphi_k^{(t)}(w_{ij}) \sum_{\tau \in \{T,D,A\}} 1_{k \in \tau} \alpha_\tau^{i(t)}}{\sum_{k'} \varphi_{k'}^{(t)}(w_{ij}) \sum_{\tau \in \{T,D,A\}} 1_{k' \in \tau} \alpha_\tau^{i(t)}}$$

where $\alpha_*^{i(t)}$ represents all topic density (i.e., T, D, A) for $i^{th}$ document at $t^{th}$ iteration.

In one embodiment, with calculated $E(\eta_{ij}^k)_{\Theta^{(t)}}$, the parameter at the next iteration is updated by maximizing the objective function, $$\text{i.e., } \Theta^{(t+1)} = \arg \max_\Theta \mathcal{L}\left( \Theta \mid E(\eta_{ij}^k)_{\Theta^{(t)}} \right)$$

with constraint $\forall k, \Sigma_w \varphi_k^{(t+1)}(w) = 1$. Specifically, the updated rule for each parameter is given below.

$$\forall k, w \quad \varphi_k^{(t+1)}(w) = \frac{\beta - 1 + \sum_{i,j} 1_{w_{ij}=w} E(\eta_{ij}^k)_{\Theta^{(t)}}}{\sum_{w'} \left( \beta - 1 + \sum_{i,j} 1_{w_{ij}=w'} E(\eta_{ij}^k)_{\Theta^{(t)}} \right)} \quad (8)$$

$$\forall i, \tau \in \{D, A\}, k \in \tau \quad (9)$$

$$\alpha_\tau^{i(t+1)}(k) = \begin{cases} \left( \sum \alpha_T^i \right) \cdot \dfrac{E(\eta_{ij}^k)_{\Theta^{(t)}}}{\sum_{k' \in \alpha_T^i} E(\eta_{ij}^{k'})_{\Theta^{(t)}}} & \text{if } \sum \alpha_T^i \neq 0 \\ \max\{\alpha_T^i \mid \forall i\} \cdot \dfrac{E(\eta_{ij}^k)_{\Theta^{(t)}}}{\max_{k' \notin \alpha_T^i} E(\eta_{ij}^{k'})_{\Theta^{(t)}}} & \text{otherwise} \end{cases}$$

As can be seen in Equation (9), there are special update rules when tone labels are all zero. These rules are necessary to guarantee a unique solution. In algorithm 1 above, the generative process from $\alpha$ to $\theta$ satisfies a Dirichlet distribution, where the probability density function is only affected by the relative scale of parameters. In other words, the topic density parameters are unbounded. In the training phase, the $\alpha_D$, $\alpha_A$ are bounded by the known tone labels $\alpha_T$ 705. But if the tone labels are all zero, there will be infinite solutions for domain-specific and auxiliary topic density. To avoid this situation, in one embodiment any arbitrary positive value can be used as "anchor." In one example embodiment, the maximum value of tone topic density is chosen so that density of other topics fall within the same scale.

In one embodiment, with the learned T-LDA model 700, there are a number of applications in analyzing tones. One goal of the T-LDA model 700 is to help people understand different tones via representative words. With T-LDA model 700, these words are obtained in two steps, i) calculate posterior probability and ii) adjust by auxiliary topic. With no loss of generality, given a particular word W 730, the T-LDA model 700 computes the posterior probability for a topic $z \in \{T, D, A\}$ in Equation (10).

$$P(z \mid w) = \frac{P(z, w)}{P(w)} = \frac{P(w \mid z) P(t)}{\sum_{z'} P(w \mid z') P(z')} = \frac{\varphi_z(w)}{\sum_{z'} \varphi_{z'}(w)} \quad (10)$$

Note that in equation 10, it is assumed that a uniform probability for selecting a topic, i.e., $P(z_i) = P(z_j)$. After step i), the normalized posterior probability for each topic is obtained. To obtain the representative words, the T-LDA model 700 subtracts it by the auxiliary one, i.e., $P(z|w) - \Sigma_{z' \in A} P(z'|w)$. This adjustment is to remove words that are representative in both target topic and the auxiliary one. Recall that by model design and learning, an auxiliary topic is for meaningless words. To find representative words for a meaningful topic (either tone or domain), the T-LDA model 700 needs to remove the noisy words in auxiliary.

Each sentence can be treated as a bag-of-word set. With calculated posterior probability for each word, the ranking of the sentence is the sum of these probabilities, i.e., $\Sigma_w P(z|w)$. Here the auxiliary probability is not used for adjustment. Because in practice it is found that the impact of the auxiliary topic is reduced due to the consideration of multiple words.

Like all latent-topic models, one of the applications is to infer a document's topic distribution vector, i.e., $\theta$ 710, given its bag-of-word feature. Naturally, given a document D, the corresponding topic distribution $\theta^D$ is obtained by maximizing the posterior likelihood, as shown in Equation 11 below.

$$\theta^D = \underset{\theta}{\operatorname{argmax}} P(\theta \mid D) = \underset{\theta}{\operatorname{argmax}} \frac{\Pi_{w \in D} \sum_z P(w \mid z) P(z \mid \theta)}{\prod_{w \in D} P(w)} \quad (11)$$

Determining $\theta^D$ is time-consuming. Thus a trade-off is to calculate each latent topic and word independently and then normalize them. Formally, let $\theta^D(k)$ denote the $k^{th}$ element of the topic distribution vector, its value is calculated as below.

$$\theta^D(k) = \frac{\sum_{w \in D} P(z = k \mid w)}{\sum_{w \in D} \sum_{z'} P(z' \mid w)} \quad (12)$$

In one embodiment, the T-LDA model 700 is used to find representative words and sentences for each tone. In one example, after the T-LDA model 700 is trained on the whole data set with textual utterance (e.g., TWEET®) coverage threshold as 4, the equations 10-12 are used to find representative words and sentences for each tone. Table 2 shows example results. In one embodiment, some tones, e.g., frustrated, impolite, sad, are easy to understand as there are strongly associated words. Some representative words are not quite straightforward, because they have a high co-occurrence frequency with other sensible words. For instance, the words "us" and "know" have a high score for tone polite. The reason is that they usually come with word "please," such as "please let us know," "please follow us," and so on. Further, there are words that do not seem to correlate with the particular tone when viewed separately. However, once several words are combined, it highly indicates the tone. For example, in tone anxious, single representative words contain "anyone," "need," "help." There is no obvious correlation between these words and anxiety. However, it makes more sense if one sees sentences like "can anyone help me," "I need help," etc.

TABLE 2

| Tone | Representative words | Example sentences (tone density label) |
| --- | --- | --- |
| anxious | need worried anyone confused help wondering address suddenly going ideas | @Support My DVD drive stopped reading and burning, I just need someone to help me find a fix, I don't need Joe interrupting me. (2.4) @PhoneCoHelp need help on the substandard phone iv got I need help. No one is ready to help!! (1.2) @WebsiteHelpers Are you going to sort the website out today, need to do serious shopping and need to log in????? (1.2) |
| excited | ! :D love sure excited awesome always best hearing fun | @Support TY! I got Tech Support on??; All IS Good! U Guys R The BEST In the Market Place! TY Always! (2.6) @OnlineHelp its fine now just got a notfication that its been dispatched thanks! Alot any trouble i know i can relie on you guys! Im happy! (2.4) Thanks for the update! If you run into anything else, let us know! (3.0) |
| frustrated | ridiculous annoying useless worst annoyed terrible frustrating rude customer frustrated !_rep | @PhoneServiceCares just dm'd you. This is ridiculous. I've been on hold for over 1 hour and 40 minutes. I'm beyond frustrated. (3.0) @BigStore is the worst!! They're customer service sucks so bad (2.8) @AirlineAir flight 1776 terrible customer service and attitude from flight attendant Terese. Rude with all passengers. Terrible. (2.6) |
| impolite | sh*t s*cks f*ck f*cking wtf s*ck damn stupid hell a*s | ^$)_$#* you Savings Bank *$*&$^ you so hard #^$)# you #&#^$) you #&$)# you (2.8) @BankSupport yet again I wait in line at drive thru ATM for 30 minutes; the stupid freaking machine cannot take check deposits. $((%$(*** YALL (2.8) @RogersHelps %#)#& u all msg me like 13 hours later wut kind of sh*tty customer service is this sh*t (3.0) |

TABLE 2-continued

| Tone | Representative words | Example sentences (tone density label) |
|---|---|---|
| polite | please us know reaching team assistance letting assist glad reach welcome | Having billing issues? We can help here. Please Follow/DM us your acct and contact info please. (3.0) Please Alex, allow us to troubleshoot your DVR for you. Please follow/Dm your account info to begin (3.0) Ok, cool! Please follow the steps to the link provided so you can secure your account. Please let us know! Thanks (3.0) |
| sad | :( disappointed bad nothing neg_work neg_happy even problem really apparently | @VirginTrains really disappointed no sarni's on the 1240 Euston to Mancs :( (2.8) @OnlineHelp really bad customer service on the phone, even more disappointed. What's an email address to complain to? (2.8) My @online order was supposed to be delivered yesterday, now it "should"" be here by Thursday. I'm not happy. (2.6) |
| satisfied | thank thanks ok much great cheers sorted good helpful resolved :) | @ElectronicsSupport hey thanks! I'm able to log in. Thanks you rock. :) thanks for the fast service (3.0) @Online Help thank you problemo resolved. Thank you so much for your prompt reply (3.0) @OnlineSupport Ok, thank you!! I will try to contact them! Thanks! (3.0) |
| sympathetic | sorry hear inconvenience look apologies us frustration apologize experience trouble | Thanks for that. We'll take a look. Sorry to hear the item arrived broken. (3.0) For assistance, pls call our Serve team @ 800XXXYYYY; they'll investigate. Sorry for any inconvenience. Enjoy your day. (2.2) We apologize for any inconvenience caused. Please follow/DM us if we can be of any assistance. We're always glad to help. (0.6) |

In one embodiment, the T-LDA model 700 can analyze the top words of domain-specific topics, e.g., a company. In one example, assume there are thirty-one (31) companies in the data set. Table 3 lists top example words of some companies. As can be seen, in general these words can be categorized into three following aspects. Contact information: when customer service replies, common contact information, such as telephone, URL, email, etc., is attached. This seems to be a response template. Company-related words: these words are highly associated with the company. Some are related to the company's service, e.g., package, tracking for @upshelp. Others are the company's product, e.g., KINDLE®, PRIME® for @amazonhelp, XBOX®, controller, console for @xboxsupport. Common issues: this category reflects common problems complained by customers. For instance, the "neg_arrive," "neg_arrived" for @amazonhelp represent the ordered package is not received. Also, "neg_service" and "neg_internet" for @attcares means the AT&T® telephone has issues with internet connection.

TABLE 3

| Company | Top words |
|---|---|
| @amazonhelp | prime amazon https://t.co/haplpmlfhn order kindle orders ordered neg_arrive |
| @ask_wellsfargo | banker compliment numbers neg_account location 1-800-869-3557 atm neg_acct |
| @deltaassist | delta https://t.co/6idgbjac2m standby cincinnati departing neg_confirm skymiles diamond captain neg_checked |
| @samsungsupport | model samsung s7 gear galaxy television edge verizon marshmallow carrier note |
| @xboxsupport | xbox console controller preview guide https://t.co/luv7xycgtq game 360 disc games |

In one embodiment, for the T-LDA model 700 there are three types of topics, i.e., tone-related, domain-specific and auxiliary. The latter two types are used to capture words that are not tone-correlated but appear in documents labeled with tones. Specifically the domain-specific contain words that have unique signature of that particular domain (e.g., company). The auxiliary topic is used to model frequent words that are neither tone-related nor domain-specific. In one example embodiment, these two types of topics help improve tone analysis. To study the impact of these two topic types, in one example the domain and auxiliary topics are switched off during training. Then the resulting top words are compared with that of the full model. The comparison is shown in Table 4. For the model with tone topic, this is denoted as tone-only. For the model without the auxiliary topic, it is denoted as tone+domain. Note that tones are skipped where there is no significant difference among models. As can be seen, in general the model with all three topic types has a more sensible set of top words for tones. For the other two models, however, there are words that are obviously domain-specific or auxiliary, which are underlined in Table 4. For tone anxious, word "xbox" is ranked high in the tone-only model but it is actually a product (thus domain-specific). The model without auxiliary ranks "password," "email" and "account" as top words, which are more suitable in the auxiliary category. For tone excited, auxiliary words "still," "not" and domain-specific words "tesco" appear in the list of the tone-only model. The auxiliary word "tomorrow" is ranked high by the tone+domain model. Finally for tone sympathetic, the tone-only model includes a domain-specific URL link.

TABLE 4

|  | Tone only | Tone + Domain | Tone + Domain + Auxiliary (T-LDA) |
|---|---|---|---|
| anxious | worried<br>wondering confused<br>xbox ideas | password email<br>account<br>wondering need | need worried<br>anyone<br>confused help |
| excited | excited still tesco<br>fun not | :D excited<br>tomorrow<br>fun neg_wait | ! :D love sure<br>excited |
| sympathetic | sorry apologies apologize<br>inconvenience<br>https://t.co/y5jpi9grhe | sorry hear<br>inconvenience<br>look apologize | sorry hear<br>inconvenience<br>look apologies |

Figure 8:
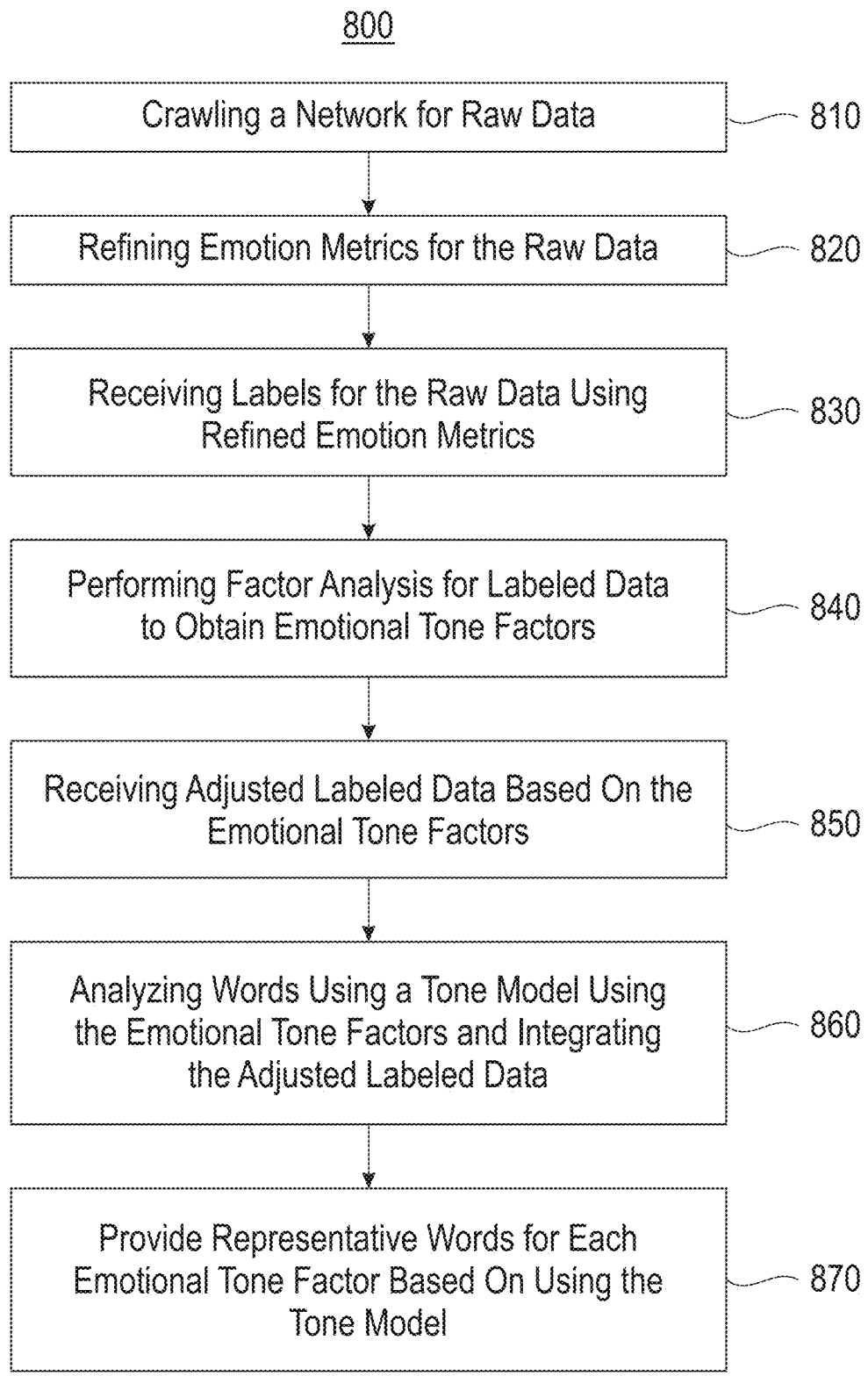
FIG. 8 illustrates a block diagram of a process for tone analysis and learning for online customer service, according to one embodiment.

FIG. 8 illustrates a block diagram of a process 800 for tone analysis and learning for online customer service, according to one embodiment. In block 810, process 800 crawls (e.g., systematically browsing, searching and capturing, etc.) a network (e.g., the Internet, a local network, a large area network, an enterprise platform, etc.) for raw data (e.g., raw textual data, documents, TWEETS®, etc.) using a system (e.g., computing node 10, FIG. 1, processing system 300, FIG. 3, system 400, FIG. 4, system 500, FIG. 5, architecture 600, FIG. 6, etc.). In block 820, process 800 refines emotion metrics for the raw data (e.g., stored in a system (e.g., computing node 10, FIG. 1, processing system 300, FIG. 3, system 400, FIG. 4, system 500, FIG. 5, architecture 600, FIG. 6, etc.). In block 830 process 800 receives labels (e.g., provided by a human, group of humans, artificial intelligence, etc.) for the raw data using refined emotion metrics. In block 840, process 800 performs factor analysis (e.g., PCA) for labeled data to obtain emotional tone factors (e.g., anxious, excited, frustrated, impolite, polite, sad, satisfied and sympathetic). In block 850, process 800 receives adjusted (e.g., annotated) labeled data based on the emotional tone factors. In block 860, process 800 analyzes words using a tone model (e.g., T-LDA) using the emotional tone factors and integrating the adjusted labeled data. In block 870, process 800 provides representative words for each emotional tone factor based on using the tone model.

In one embodiment, in process 800 the T-LDA model models tone intensity and determines corresponding descriptive words and sentences. In one embodiment, the T-LDA model uses a set of topics to generate words based on a corresponding word-distribution vector.

In one embodiment, in process 800 the set of topics comprise a tone-related topic, a domain-specific topic, and an auxiliary topic. In one embodiment, in process 800 the tone model provides at least one of the following: providing an understanding for the emotional tone factors via representative words, providing example sentences for each emotional tone factor or documenting topic distribution for the set of topics. In one embodiment, the representative words are obtained using the T-LDA model based on determining posterior probabilities and adjusting the probabilities based on the auxiliary topic.

As will be appreciated by one skilled in the art, aspects of the present embodiments can be embodied as a system, method or computer program product. Accordingly, aspects of the present embodiments can take the form of an entirely hardware embodiment, an entirely software embodiment (including firmware, resident software, micro-code, etc.) or an embodiment combining software and hardware aspects that can all generally be referred to herein as a "circuit," "module" or "system." Furthermore, aspects of the present embodiments can take the form of a computer program product embodied in one or more computer readable medium(s) having computer readable program code embodied thereon.

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electromagnetic, optical, or any suitable combination thereof. A computer readable signal medium can be any computer readable medium that is not a computer readable storage medium and that can communicate, propagate, or transport a program for use by or in connection with an instruction execution system, apparatus, or device.

Program code embodied on a computer readable medium can be transmitted using any appropriate medium, including but not limited to wireless, wireline, optical fiber cable, RF, etc., or any suitable combination of the foregoing.

Computer program code for carrying out operations for aspects of the present embodiments can be written in any combination of one or more programming languages, including an object oriented programming language such as Java, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

Aspects of the present embodiments are described below with reference to flowchart illustrations and/or block diagrams of methods, apparatus (systems) and computer program products according to various embodiments. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiment was chosen and described in order to best explain the principles of the embodiments and the practical application, and to enable others of ordinary skill in the art to understand the various embodiments with various modifications as are suited to the particular use contemplated.

What is claimed is:

1. A method comprising:
   receiving, by a processor, adjusted labeled data;
   executing, by the processor, a computing factor analysis for the received adjusted labeled data to obtain and store emotional tone factors in a memory device;
   executing, by the processor, a tone modified latent Dirichlet allocation (T-LDA) machine learning model that models tone intensity, wherein the T-LDA machine learning model uses the emotional tone factors and integrates the adjusted labeled data for processing words;
   identifying, by the processor, representative words for each emotional tone factor by the T-LDA machine learning model, wherein the representative words are identified by the T-LDA machine learning model based on computing posterior probabilities and adjusting the posterior probabilities based on an auxiliary topic, and the T-LDA machine learning model outputs examples of tone; and executing, by the processor, model prediction processing using the examples of tone and unlabeled data to output predicted tone for tone labeling for the unlabeled data.

2. The method of claim 1, further comprising:
crawling a network for raw data; and
refining emotion metrics for the raw data.

3. The method of claim 2, further comprising:
receiving, by the processor, the labeled data for the raw data using the refined emotion metrics.

4. The method of claim 3, wherein:
executing the computing factor analysis comprises executing, by the processor, a principal components analysis (PCA) computing process on the labeled data to define the emotional tone factors; and
the emotional tone factors comprise tone metrics that are selected from the group consisting of an anxious metric, an excited metric, a frustrated metric, an impolite metric, a polite metric, a sad metric, a satisfied metric and a sympathetic metric.

5. The method of claim 4, wherein the T-LDA machine learning model identifies corresponding descriptive words and sentences.

6. The method of claim 5, wherein the T-LDA machine learning model uses a set of topics to identify words based on a corresponding word-distribution vector, the set of topics comprises a tone-related topic, a domain-specific topic, and the auxiliary topic, and each single word of the representative words is identified by a single topic of the set of topics.

7. The method of claim 6, wherein the T-LDA machine learning model provides at least one of the following: providing an understanding for the emotional tone factors via the representative words, providing example sentences for each emotional tone factor or documenting topic distribution for the set of topics.

8. A computer program product for tone analysis for online customer service, the computer program product comprising a non-statutory computer readable storage medium having program instructions embodied therewith, the program instructions executable by a processor to cause the processor to:
receive, by the processor, adjusted labeled data;
execute, by the processor, a computing factor analysis for the received adjusted labeled data to obtain and store emotional tone factors in a memory device;
execute, by the processor, a tone modified latent Dirichlet allocation (T-LDA) machine learning model that models tone intensity, wherein the T-LDA machine learning model uses the emotional tone factors and integrates the adjusted labeled data for processing words;
identify, by the processor, representative words for each emotional tone factor by the T-LDA machine learning model, wherein the representative words are identified by the T-LDA machine learning model based on computing posterior probabilities and adjusting the probabilities based on an auxiliary topic, and the T-LDA machine learning model outputs examples of tone; and
execute, by the processor, model prediction processing using the examples of tone and unlabeled data to output predicted tone for tone labeling for the unlabeled data.

9. The computer program product of claim 8, wherein the program instructions executable by the processor further cause the processor to:
crawl, by the processor, a network for raw data; and
receive, by the processor, refined emotion metrics for the raw data.

10. The computer program product of claim 9, wherein the program instructions executable by the processor further cause the processor to:
receive, by the processor, the labeled data for the raw data using the refined emotion metrics.

11. The computer program product of claim 10, wherein:
executing the computing factor analysis comprises executing, by the processor, a principal components analysis (PCA) computing process on the labeled data to define the emotional tone factors; and
the emotional tone factors comprise tone metrics that are selected from the group consisting of an anxious metric, an excited metric, a frustrated metric, an impolite metric, a polite metric, a sad metric, a satisfied metric and a sympathetic metric.

12. The computer program product of claim 11, wherein the T-LDA machine learning model identifies corresponding descriptive words and sentences.

13. The computer program product of claim 12, wherein the T-LDA machine learning model uses a set of topics to identify words based on a corresponding word-distribution vector, the set of topics comprises a tone-related topic, a domain-specific topic, and the auxiliary topic, and each single word of the representative words is identified by a single topic of the set of topics.

14. The computer program product of claim 13, wherein:
the T-LDA machine learning model provides at least one of the following: providing an understanding for the emotional tone factors via representative words, providing example sentences for each emotional tone factor or documenting topic distribution for the set of topics.

15. An apparatus comprising:
a memory configured to store instructions; and
a processor configured to execute the instructions to:
receive adjusted labeled data;
execute a computing factor analysis for the received adjusted labeled data to obtain and store emotional tone factors in a memory device;
execute a tone latent Dirichlet allocation (T-LDA) machine learning model that models tone intensity, wherein the T-LDA machine learning model uses the emotional tone factors and integrates the adjusted labeled data for processing words;
identify representative words for each emotional tone factor by the T-LDA machine learning model, wherein the representative words are identified by the T-LDA machine learning model based on computing posterior probabilities and adjusting the probabilities based on an auxiliary topic, and the T-LDA machine learning model outputs examples of tone; and
execute model prediction processing using the examples of tone and unlabeled data to output predicted tone for tone labeling for the unlabeled data.

16. The apparatus of claim 15, wherein the processor is further configured to execute the instructions to:
crawl a network for raw data; and
receive refined emotion metrics for the raw data.

17. The apparatus of claim 16, wherein the processor is further configured to execute the instructions to:
receive the labeled data for the raw data using the refined emotion metrics.

18. The apparatus of claim 17, wherein executing the computing factor analysis comprises executing, by the processor, a principal components analysis (PCA) computing process on the labeled data to define the emotional tone factors, and the emotional tone factors comprise tone metrics that are selected from the group consisting of an anxious metric, an excited metric, a frustrated metric, an impolite metric, a polite metric, a sad metric, a satisfied metric and a sympathetic metric.

19. The apparatus of claim 18, wherein the T-LDA machine learning model identifies corresponding descriptive words and sentences, and the T-LDA machine learning model uses a set of topics to identify words based on a corresponding word-distribution vector, the set of topics comprise a tone-related topic, a domain-specific topic, and the auxiliary topic, and each single word of the representative words is identified by a single topic of the set of topics.

20. The apparatus of claim 19, wherein:
the -LDA machine learning model provides at least one of the following: providing an understanding for the emotional tone factors via representative words, providing example sentences for each emotional tone factor or documenting topic distribution for the set of topics.

\* \* \* \* \*